(12) United States Patent
Yokel et al.

(10) Patent No.: US 10,951,504 B2
(45) Date of Patent: Mar. 16, 2021

(54) DYNAMIC ADJUSTMENT OF SERVICE CAPACITY

(71) Applicant: T-Mobile USA, Inc., Bellevue, WA (US)

(72) Inventors: Ryan Yokel, Seattle, WA (US); Rudy Bourcelot, Everett, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/371,797

(22) Filed: Apr. 1, 2019

(65) Prior Publication Data

US 2020/0313995 A1 Oct. 1, 2020

(51) Int. Cl.
*H04L 12/26* (2006.01)
*H04W 24/08* (2009.01)

(52) U.S. Cl.
CPC ......... *H04L 43/0882* (2013.01); *H04W 24/08* (2013.01)

(58) Field of Classification Search
CPC ....... H04L 43/0882; H04L 2012/5608; H04W 24/08; H04W 84/12; H04W 88/08; H04W 80/04; H04W 88/06; H04W 84/18; H04W 74/08
See application file for complete search history.

(56) References Cited

U.S. PATENT DOCUMENTS

| | | | |
|---|---|---|---|
| 9,723,151 B2 | 8/2017 | McGann et al. | |
| 10,038,788 B1 | 7/2018 | Khalatian | |
| 10,715,670 B2 | 7/2020 | Ellison | |
| 2002/0194319 A1 | 12/2002 | Ritche | |
| 2007/0174390 A1 | 7/2007 | Silvain et al. | |
| 2013/0003563 A1 | 1/2013 | Croak et al. | |
| 2013/0103749 A1 | 4/2013 | Werth et al. | |
| 2013/0171983 A1* | 7/2013 | Zhang | H04W 28/08 455/422.1 |
| 2013/0346447 A1 | 12/2013 | Wu et al. | |
| 2014/0022328 A1 | 1/2014 | Gechter et al. | |
| 2015/0117632 A1 | 4/2015 | Konig et al. | |
| 2016/0044174 A1 | 2/2016 | Tuchman et al. | |

(Continued)

OTHER PUBLICATIONS

U.S. Appl. No. 16/371,834, Final Office Action dated Jun. 9, 2020, 43 pages.

(Continued)

*Primary Examiner* — Brenda H Pham
(74) *Attorney, Agent, or Firm* — Han Santos, PLLC

(57) ABSTRACT

Techniques are described for estimating capacity need in a service network and for dynamically adjusting resources to meet the estimated capacity. When an enterprise is contacted by a user with an issue, a service system determines an intent of the contact. The service system then determines if the issue is something that may arise with a significant number of users in the foreseeable future. Once the service system knows how many users with a similar issue may be contacting the enterprise, the service system makes a determination as to the capacity the service system has to handle the specific issue and the number of user communications. This is accomplished by searches of agent profiles to determine which agents have the ability to resolve the intent. Agents so identified are added to the capacity until the capacity is great enough to handle the expected user communications.

20 Claims, 12 Drawing Sheets

(56) References Cited

U.S. PATENT DOCUMENTS

| | | |
|---|---|---|
| 2016/0140590 A1* | 5/2016 | Marecek ............ G06Q 30/0206 |
| | | 705/7.35 |
| 2016/0283995 A1 | 9/2016 | Matula et al. |
| 2017/0013130 A1 | 1/2017 | Hall |
| 2017/0054851 A1 | 2/2017 | Dervan et al. |
| 2017/0221071 A1 | 8/2017 | York |
| 2017/0316438 A1 | 11/2017 | Konig et al. |
| 2019/0356562 A1 | 11/2019 | Watkins et al. |

OTHER PUBLICATIONS

U.S. Appl. No. 16/194,180, Non Final Office Action dated Nov. 1, 2019, 10 pages.

U.S. Appl. No. 16/194,180, Notice of Allowance dated Mar. 26, 2020, 13 pages.

U.S. Appl. No. 16/371,834, Non Final Office Action, dated Jan. 22, 2020, 21 pages.

U.S. Appl. No. 16/371,834, Notice of Allowance dated Aug. 20, 2020, 40 pages.

\* cited by examiner

| | |
|---|---:|
| AGENT ID | 502 |
| INTENT ID 1 | 504 |
| INTENT ID 2 | 506 |
| INTENT ID 3 | 508 |
| ⋮ | |
| DEVICE ID 1 | 510 |
| DEVICE ID 2 | 512 |
| DEVICE ID 3 | 514 |
| DEVICE ID 4 | 516 |
| DEVICE ID 5 | 518 |
| DEVICE ID 6 | 520 |
| DEVICE ID 7 | 522 |
| DEVICE ID 8 | 524 |
| DEVICE ID 9 | 526 |
| ⋮ | |
| TIME ON JOB | 528 |
| RESOLUTION | 530 |
| RESPONSE TIME | 532 |
| CUSTOMER RATING | 534 |
| GEOGRAPHY REGION 1 | 536 |
| GEOGRAPHY REGION 2 | 538 |
| GEOGRAPHY REGION 3 | 540 |
| GROUP ID 1 | 542 |
| GROUP ID 2 | 544 |
| GROUP ID 3 | 546 |
| ⋮ | |

AGENT PROFILE
500

FIG. 5

| | |
|---|---|
| COMMUNICATION ID | 602 |
| DEVICE ID | 604 |
| INTENT ID | 606 |
| DEVICE DATA 1 | 608 |
| DEVICE DATA 2 | 610 |
| DEVICE DATA 3 | 612 |
| DEVICE DATA 4 | 614 |
| DEVICE DATA 5 | 616 |
| NETWORK TOWER ID | 618 |
| NETWORK DATA 1 | 620 |
| NETWORK DATA 2 | 622 |
| NETWORK DATA 3 | 624 |
| NETWORK DATA 4 | 626 |
| NEIGHBOR DATA 1 | 628 |
| NEIGHBOR DATA 2 | 630 |
| NEIGHBOR DATA 3 | 632 |
| NEIGHBOR DATA 4 | 634 |
| USER DATA 1 | 636 |
| USER DATA 2 | 638 |
| USER DATA 3 | 640 |
| USER DATA 4 | 642 |
| ⋮ | |

INTENT PARAMETERS
ARRAY
600

FIG. 6

DYNAMIC ADJUSTMENT OF SERVICE CAPACITY

BACKGROUND

Most enterprises that sell products and/or services maintain user support services to assist users of the products/services. The quality of such user support often affects how users feel about their purchase from the enterprise, which can be critical in their decisions whether or not to purchase future products/services from the enterprise. Quality user support service operations typically aim to achieve one or more of several goals, most or all of which operate to reduce the time it takes to resolve any issue that a user is experiencing. However, determining a quantity of future support contacts is difficult to determine, and if the enterprise does not activate sufficient resources to handle user support contacts, then user satisfaction with regard to their user support experience is very likely to be degraded. Enterprises, therefore, are in need of an accurate way to predict upcoming service contacts and ensure that there are sufficient resources to handle the service contacts appropriately when they are received.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 5 is a representation of an example agent profile in accordance with the technologies described herein.

FIG. 6 is a representation of an example intent parameters array in accordance with the technologies described herein.

DETAILED DESCRIPTION

Overview

Figure 1:
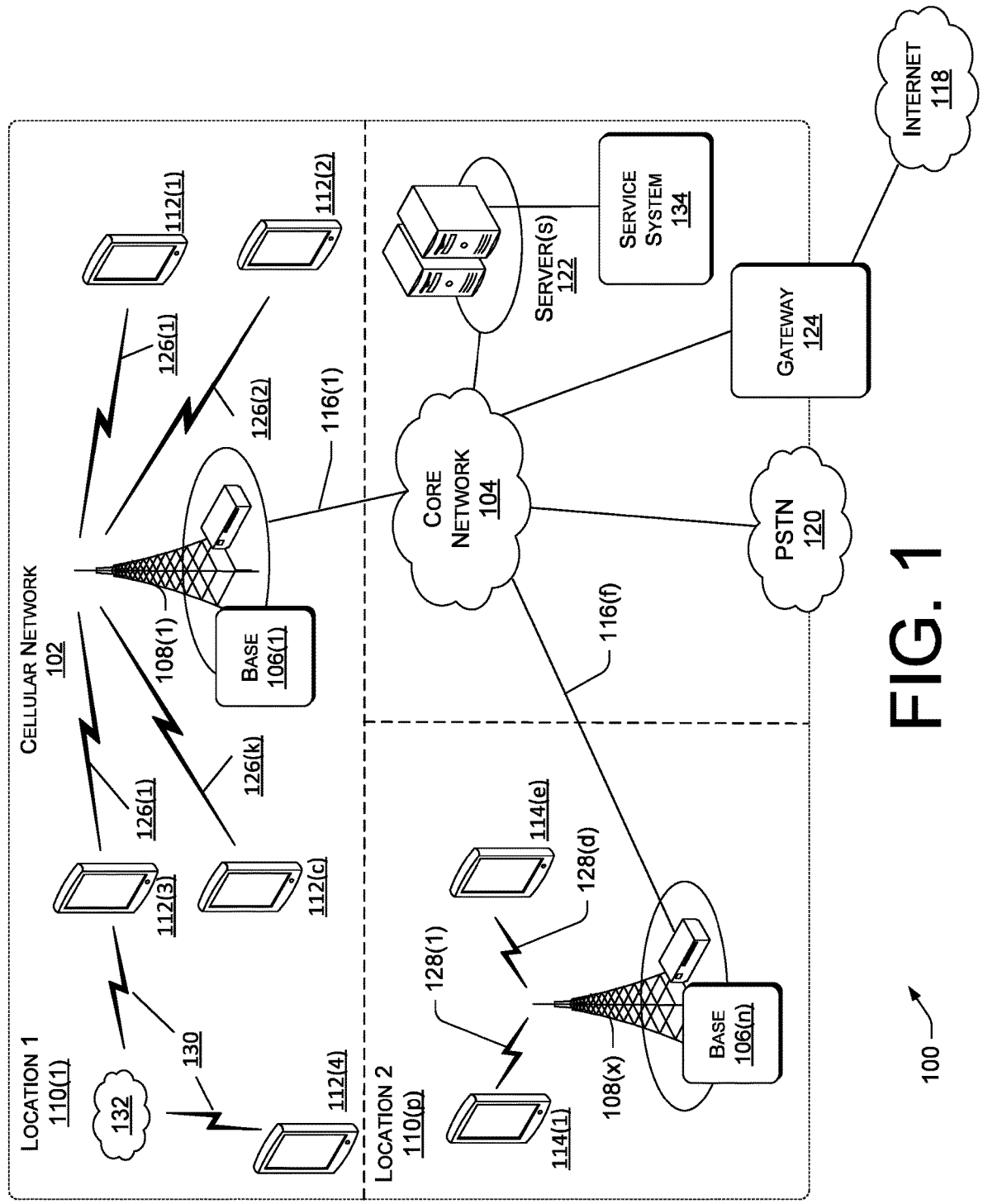
FIG. 1 is a diagram of an example cellular network that implements a user support services system with a predictive service as described herein.

Techniques and systems are described for estimating capacity need in a service network and for dynamically adjusting resources to meet the estimated capacity. When an enterprise is contacted (by phone, email, text message, etc.) by a user with an issue, a service system determines an intent (i.e., what the user is calling about) of the communication. In other words, the service system determines why the user is contacting the enterprise, whether there is a technical issue with a device, a technical issue with the enterprise infrastructure, an issue or question related to billing, a question for a store representative, etc. After determining the intent of the user communication, the service system attempts to determine if the issue is something that may arise with a significant number of users in the foreseeable future. For example, if a software update to a number of devices has just been released, and the intent of a user communication is an issue with the device that occurred during the update, the service system can determine how many users with similar devices can be expected to experience the same issue.

Once the service system knows how many users with a similar issue may be contacting the enterprise, the service system makes a determination as to the capacity the service system has to handle the specific issue and the number of user communications. In this regard, "capacity" is usually in reference to a number of persons (i.e., "agents") available to respond to the user communication. But in the case of a user contacting the enterprise with a question related to the user's bill, routing the user to a technical agent is not the best way to get the user's issue resolved quickly. In fact, it is likely that such a technical agent will never solve the user's issue. As a result, the user's and the agent's time is wasted and the user still has an unanswered question. Because of the fact that many of the agents that are available may not have the training or knowledge to respond to intents of a particular kind, the service system also takes into account each agent's particular skills when evaluating capacity, thus giving a more accurate evaluation of capacity.

Since a typical enterprise has agents that have various skills, such as knowledge of particular products, services, networks, billing, customer accounts, etc., the service system tracks specific skills of each agent. When a user communication is made, and an intent of the communication is determined, the service system searches for an available agent who has the ability to resolve the intent. As a result, the first agent that receives the contact will typically be able to resolve the user issue the first time the user contacts the enterprise. As a result, loads and wait times on the service system can be reduced.

This technique generally increases capacity of the service system because some agents have skills in addition to the skills required for their particular job. Use of the techniques described herein means that such an agent may receive a call that is not specific to his job, but relates to knowledge he possesses. For example, Agent Alice works for a cellular service provider, in a tech support job wherein she resolves solutions related to networks. Agent Alice also happens to have specialized knowledge related to iPhones® because she owns and uses an iPhone® and because she has received special training for iPhones®. If the cellular service provider receives a user communication having an intent indicating the user is experiencing an issue with the user's iPhone®, the service system is able to recognize that iPhone® intents can be routed to Agent Alice, in addition to the agents that are dedicated to iPhone® support. If dedicated agents are fully utilized, the service system understands that it can route an iPhone® intent to Agent Alice and likely get a quick resolution to the user's issue. An agent's knowledge may extend beyond the issues for which the agent typically provides support. By tapping into that knowledge, the service system expands the capacity for efficiently resolving particular issues.

Another way in which the presently described techniques may be used in the service system to increase capacity to handle certain issues is that the service system can understand, from an agent's profile, if the agent can resolve a user's issue if the agent has some guidance. For example, Agent Aparna may work in a device support group resolving issues related to iOS®. Although Agent Aparna's skills may relate to iOS®, it is likely that she can diagnose and resolve an issue with Android® systems if she has a little guidance related to the issue. So, if a user communication is received and the intent is related to Android®, the service system may route the user communication to Agent Aparna if agents that usually support Android® are unavailable. However, instead of simply routing the user communication to Agent Aparna, the service system also provides resolution content (i.e., content that is related to the determined intent) to Agent Aparna so she can easily learn particular steps to take related to the Android® issue to resolve the user's issue. Because the service system knows that Agent Aparna, with assistance, is able to resolve this particular issue with Android® devices, the service system can include Agent Aparna as capacity for such issues.

In one or more implementations described herein, resolution content related to particular products or services is automatically created by the service system. Resolution content may be virtually any type of content such as, for example, step-by-step directions on how to perform an action, video content showing how to investigate and/or resolve an issue, content that provides some background understanding of the issue, etc. To have such resolution content available, the service system causes resolution content to be created if it does not already exist. When the service system identifies an intent having certain parameters and no resolution content is available, the service system routes the user communication to a skilled agent that is available to respond to the user communication. As the agent works through the issue and identifies a solution, the service system monitors the agent's work and is able to reproduce a summary detailing steps taken by the agent to resolve the issue. Resolution content specific to the issue is created by combining, for example, the steps taken to resolve the issue with related explanatory content. The resolution content is then associated with the specific parameters of the issue. After that, when an intent having identical parameters is determined from a user communication, the resolution content is available to be provided to agents to service the issue.

These and other innovative techniques are described in greater detail, below, with respect to FIGS. 1-12. It is noted that, although the techniques described herein can be implemented in various systems, the present discussion focuses on a service system implemented in a cellular service provider enterprise. A typical cellular service provider enterprise performs many functions including, but not limited to, selling cellular devices, providing cellular infrastructure, billing users for services related to the cellular service, etc. Issues can arise in relation to any of these functions, and the enterprise maintains services to provide issue resolution and support with issues related to these functions.

In a typical enterprise, support for the various functions is provided in one of two ways. In a first way, the enterprise provides support agents that handle user communications on all issues. A problem with this approach is that agents will sometimes receive user communications for issues that they are not trained to resolve. Eventually, the user has to be redirected to an agent that has knowledge on the subject. This takes time and resources and does not provide an optimum user experience. In a second way, user communications are directed to agents that have particular knowledge. For example, if a user has a billing issue and contacts the enterprise, the user contacts a specific phone number or address for agents that have knowledge of billing issues. A problem with this approach is that many agents may have sufficient knowledge to handle user communications in areas other than what they are assigned to support. This means that such agents are not often utilized to their fullest capacity. The techniques described herein disclose systems and methods for dynamic adjustment of service capacity that address, among other things, the problems described above.

Example Support Services System

FIG. 1 illustrates an example cellular network architecture 100 for implementing the technology described herein. The network architecture 100 includes a cellular network 102 that is provided by a wireless telecommunication carrier. The cellular network 102 includes a core network 104 and cellular network base stations 106(1)-106(j), each of which includes a transmission tower 108(1)-108(x). Each base station 106(1)-106(j) and transmission tower 108(1)-108(x) are located in different geographical locations. Base station 106(1) and transmission tower 108(1) are located in "Location 1" 110(1), and base station 106(j) and transmission tower 108(n) are located in "Location x" 110(p). Although only two base stations 106 and two transmission towers 108 are shown in this example, the cellular network 102 may comprise any number of base stations, hence the reference to "m" in certain reference numerals. The cellular network 102 provides telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), and/or so forth.

The base stations 106(1)-106(j) are responsible for handling voice and data traffic between multiple user devices (such as user devices 112(1)-112(c) and 114(1)-114(e), respectively) and the core network 104. Each user device 112(1)-112(c) and 114(1)-114(e) communicates with a base station 106 in a location of each user device 112(1)-112(c) and 114(1)-114(e). In particular, user devices 112(1)-112(c) communicate with base station 106(1), by way of transmission tower 108(1), and user devices 114(1)-114(e) communicate with base station 106(j), by way of transmission tower 108(x). Each of the base stations 106(1)-106(j) are communicatively connected to the core network 104 via a corresponding backhaul 116(1)-114(f). Each of the backhauls 116(1)-114(f) are implemented using copper cables, fiber optic cables, microwave radio transceivers, and/or the like.

The core network 104 also provides telecommunication and data communication services to the user devices 112 (1)-112(c) and 114(1)-114(e). In the present example, the core network connects the user devices 112(1)-112(c) and 114(1)-114(e) to other telecommunication and data communication networks, such as the Internet 118 and a public switched telephone network (PSTN) 120. The core network 104 includes one or more servers 122 that implement network components, store data, implement applications, etc. For example, the network components may include a serving GPRS support node (not shown) that routes voice calls to and from the PSTN 120, a Gateway GPRS Support Node (not shown) that handles the routing of data communication between external packet switched networks and the core network 104. The network components may further include a Packet Data Network (PDN) gateway (PGW) 124 that routes data traffic between the GGSN 124 and the Internet 118.

Each of the user devices 112(1)-112(c) and 114(1)-114(e) is an electronic communication device, including but not limited to, a smartphone, a tablet computer, a portable personal computer, an embedded computer system, etc. Any electronic device that is capable of using the wireless communication services that are provided by the cellular network 102 may be communicatively linked to the cellular network 102. For example, a user may use a user device 112(1) to make voice calls, send and receive text messages, and download content from the Internet 118. User devices 112(1)-112(c) and 114(1)-114(e) are communicatively connected to the core network 104 via a base station 106. Accordingly, communication traffic between user devices 112(1)-112(c) and the core network 104 are handled, respectfully, by wireless interfaces 126(1)-126(k) that connect the user devices 112(1)-112(c) to base station 106(1)-106(j). Similarly, communication traffic between user devices 114(1)-114(e) and the core network 104 are handled by wireless interfaces 128(1)-128(d) that connect the user devices 114 to base station 106(j). In some cases, a user device (such as user devices 112(3) and 112(4)) may communicate with a base station 106 by way of a wireless interface 130 to a local network 132, such as a hot spot network set up by another user device 112, a private wireless network, a public access wireless network, or the like.

The cellular network 102 is capable of monitoring characteristics of communications that pass through the cellular network 102 from user devices 112(1)-112(c), 114(1)-114(e), the Internet 118, the PSTN 120, or from any other source. Descriptions of such characteristics are stored in the servers 122, and is commonly referred to as metadata. In the present example, such metadata are stored in call data records used by a service system 134. As described in greater detail, below, the service system 134 stores information related to user support communications from all network users via user devices 112(1)-112(c) and 114(1)-114(e) and can include, without limitation, the user's support history data, a user's device data, a user's account data, network data, and/or the like.

Example User Support Services

Figure 2:
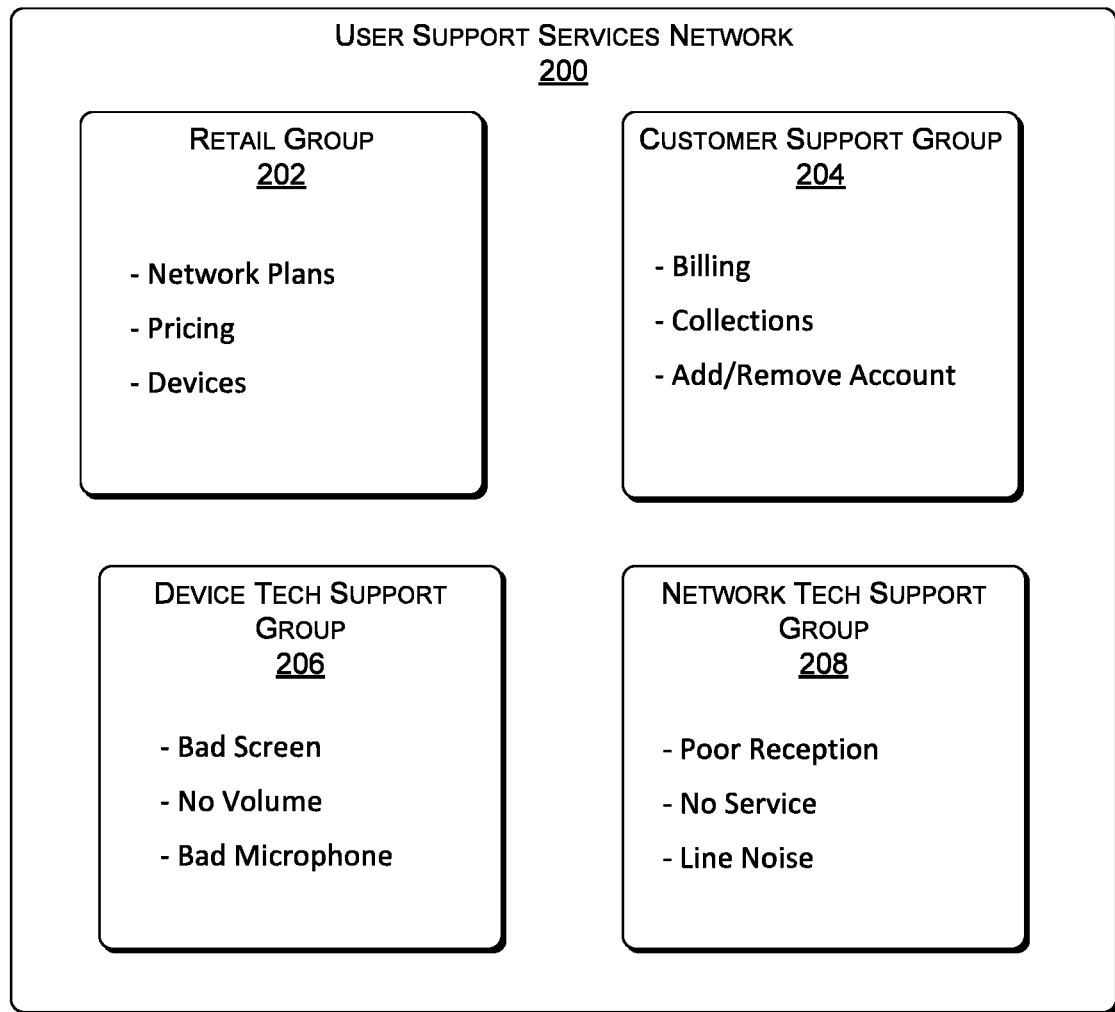
FIG. 2 is a diagram of an example user support network context in which the predictive technological solutions described herein may be implemented.

FIG. 2 is a block diagram representing agents in an example user support services network 200 in accordance with the service capacity adjustment technologies described herein. The user support services network 200 shows agents that are assigned to different groups according to roles, a role indicating the subject matter in which the agents in the group specialize. Typically, an agent in a group has been trained to support users that encounter issues in different technologies or fields. The example user support services network 200 includes a retail group 202, a customer support group 204, a device technology support group 206, and a network technology support group 208. Although only four groups are shown representing four subjects, it is noted that one or more other implementations can include more or fewer groups, and/or groups having expertise in different subject matter. The groups shown here are for representative purposes only.

Agents in the retail group 202 have specialized knowledge related to cellular network usage plans, plan pricing, devices that are sold by retail outlets of an enterprise associated with the user support services network 200, etc. The customer support group 204 includes agents knowledgeable about user billing, account collections, adding user accounts, removing user accounts, etc. Agents in the device technology support group 206 have skills relating to devices sold by the enterprise and/or used with the enterprise cellular services. For example, agents in the device technology support group 206 are able to support users having issues with a bad device screen, a lack of volume in a device, a bad device microphone, and the like. The network technology support group 208 includes agents particularly skilled in technology associated with a cellular network maintained and used by the enterprise, such as poor reception, no service, line noise, etc. The following discussion refers to these groups 202, 204, 206, and 208 to explain the features and benefits of the disclosed techniques.

Example Support System

Figure 3:
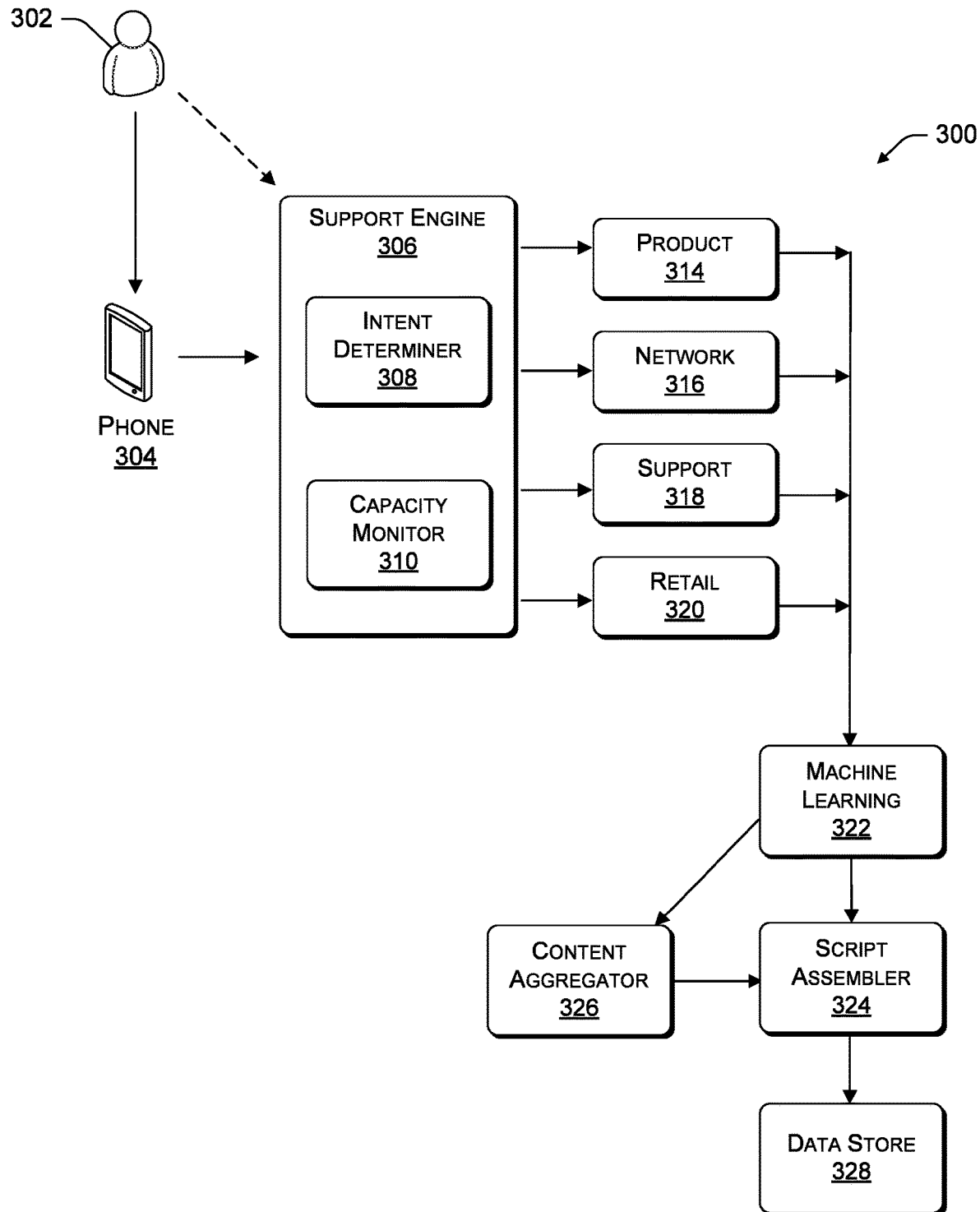
FIG. 3 is a high-level flow diagram depicting one or more implementations described herein.

FIG. 3 is a high-level flow diagram of an example support system 300 depicting basic components for implementing dynamic adjustment of service capacity described herein, as well as a general flow of information between the components shown. It is noted that although specific components are shown in FIG. 3, more, fewer, and/or other components may be implemented within the scope of the techniques presently described. Furthermore, although specific information flows are indicated in FIG. 3, other flows may be implemented without departing from the scope of the described techniques.

The example support system 300 includes a user 302, representing one or more users associated with the support system 300. In the presently described context of a cellular provider network, the user 302 is typically a user of a cellular device, such as cell phone 304. The example support system 300 includes a support engine 306, that includes several functionalities described herein, including an intent determiner 308 and a capacity monitor 310. The example support system 300 also includes agent support groups. The support groups include a product group 314, a network group 316, a support group 318, and a retail group 320. The product group 314 includes agents that have skills related to devices and services sold by the enterprise. The network group 316 includes agents that have skills related to networks, such as the cellular network maintained by the enterprise, wireless networks, etc. The support group 318 includes agents that have skills related to customer support with subjects such as customer billing, customer account status, etc. The retail group 320 includes agents that have skills related to retail sales for the enterprise. Agents in the retail group 320 have skills related to things like cellular service plans, current enterprise promotions, etc., although each agent has primary skills related to the group to which the agent belongs. However, some agents may have secondary skills that fall outside of the agent's group. The techniques described herein explain how the enterprise can utilize secondary skills of its agents.

The intent determiner 308 receives a user communication, either by way of the cell phone 304 (phone call, text message, email, etc.) or by other means (e.g., computer, a different phone, etc.), and determines a subject matter of the user communication. In other words, the intent determiner 308 determines why the user is contacting the enterprise. Once the intent is determined, the user communication is passed to an appropriate agent group 314-320 that is equipped to resolve issues related to the subject matter of the intent. An agent can then begin to resolve the user's issue.

The capacity monitor 310, as described in greater detail below, makes periodic determinations as to whether or not there is sufficient capacity in the user support services network 200 (FIG. 2) to handle an estimated future volume of user communications. In a typical case, the intent of a user communication is something that has been handled previously and it can be routed to an agent that has experience with handling such intents, and the intent is resolved by the agent. But at times, information is available with which the capacity monitor 310 can determine that similar user communications with the same intent can be expected in the relatively near future. For example, if a device maker issues an upgrade to operating systems of their devices, and a user intent is determined to be an issue that occurs as a result of a user installing the upgrade, the capacity monitor 310 can determine that similar user communications will be coming from each of the upgraded devices in the network. If there are x such devices associated with the cellular provider network, then the capacity monitor 310 may estimate that x user communications with similar intents can be expected in the near future, as device users install the upgrade. The capacity monitor 310 can then determine if there are enough agents to handle the estimated upcoming contacts and, if not, the support engine 306 can increase capacity as needed in techniques described below.

The example support system 300 also includes a machine learning module 322 that monitors an agent's actions that resolve a specific intent. The agent actions that are recorded/described can be keyboard entries, voice conversations, content accessed during the resolution, etc. Knowledge gained from the machine learning module 322 is inputted to a script assembler 324 and a content aggregator 326. The script assembler 324 creates a script outlining the actions taken by the agent in resolving the intent. Thereafter, other agents can follow the script to resolve similar intents. The script assembler 324 can also draw content identified and accessed by the content aggregator 326 to include with a script. This content is related to the intent and may comprise articles related to the intent, videos describing actions to accomplish certain tasks, and/or any content that may be helpful to train an agent to resolve the intent. When a script is created, it is stored in an accessible data store 328. Once a script is stored and available, when additional agents are needed to handle a certain capacity of similar intents, the support engine 306 can route a user communication having such an intent to an agent that does not have specific skills related to the intent, but is likely to be able to use the script to resolve the intent. Accordingly, the support engine 306 may distribute the script to such an agent so that the agent may resolve the intent or an issue related to the intent. These features of the example support system 300 and more are described below, with respect to subsequent figures.

Example Server

Figure 4:
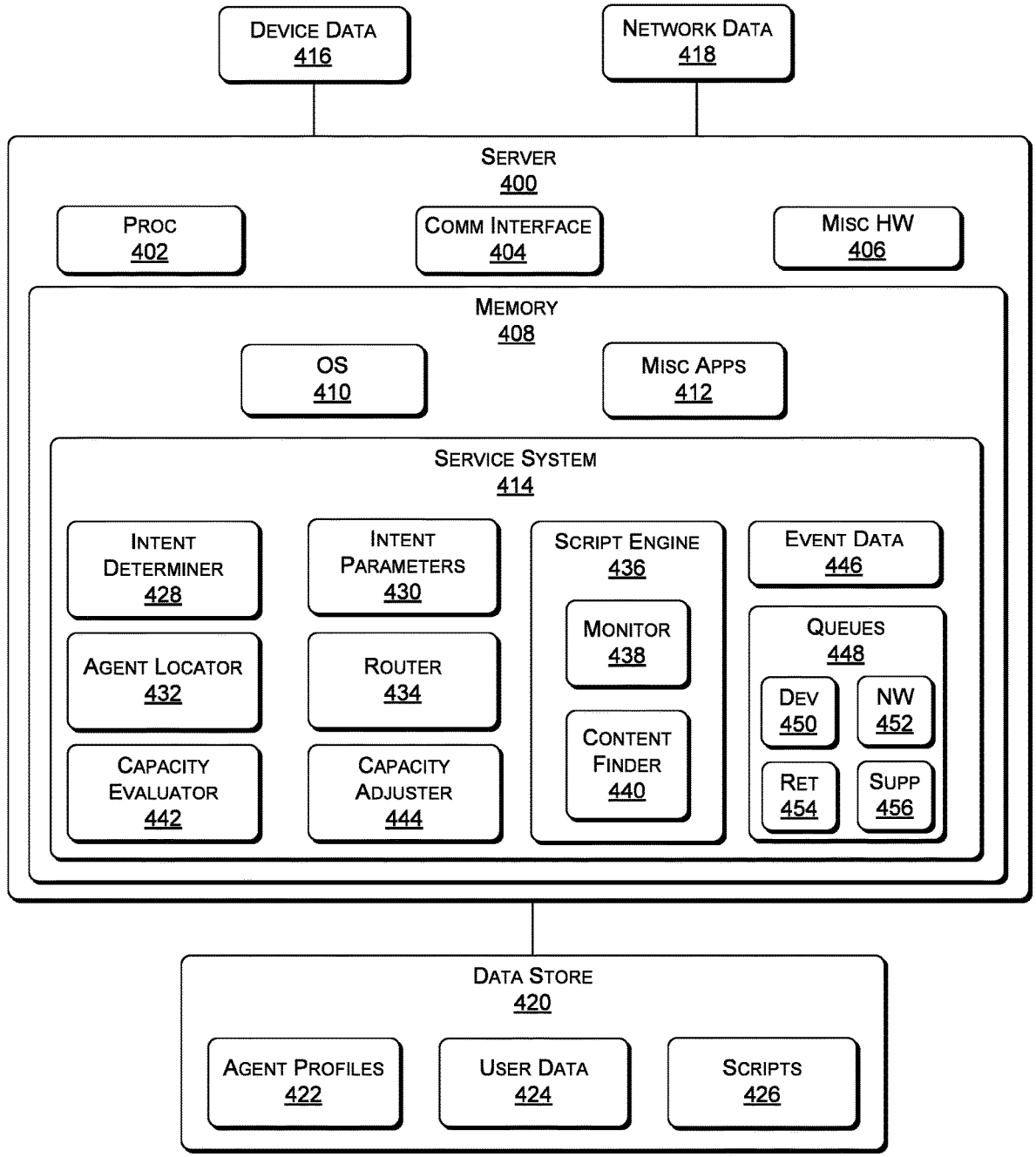
FIG. 4 is a block diagram of an example server in accordance with the technologies described herein.

FIG. 4 is a block diagram of an example server 400 in accordance with the technologies described herein. The one or more servers 122 shown in FIG. 1 are examples of the example server 400 in an operating environment, in particular, the example user support network context 200 (FIG. 2). In the following discussion, continuing reference may be made to previous figures, including elements and reference numbers included therein.

Also, in the following discussion, certain interactions may be attributed to particular components. It is noted that in at least one alternative implementation not particularly described herein, other component interactions and communications may be provided. The following discussion of FIG. 4 merely represents a subset of all possible implementations. Furthermore, although other implementations may differ, one or more elements of the example server 400 are described as a software application that includes, and has components that include code segments of processor-executable instructions. As such, certain properties attributed to a particular component in the present description, may be performed by one or more other components in an alternate implementation. An alternate attribution of properties, or functions, within the example server 400 is not intended to limit the scope of the techniques described herein or the claims appended hereto.

The example server 400 includes one or more processors 402, one or more communication interfaces 404, and miscellaneous hardware 406. Each of the one or more processors 402 may be a single-core processor or a multi-core processor. The communication interface 404 facilitates communication with components located outside the example server 400, and provides networking capabilities for the example server 400. For example, the example server 400, by way of the communications interface 404, may exchange data with other electronic devices (e.g., laptops, computers, other servers, etc.) via one or more networks, such as the Internet. Communications between the example server 400 and other electronic devices may utilize any sort of communication protocol known in the art for sending and receiving data and/or voice communications.

The miscellaneous hardware 406 includes hardware components and associated software and/or or firmware used to carry out device operations. Included in the miscellaneous hardware 406 are one or more user interface hardware components not shown individually, such as a keyboard, a mouse, a display, a microphone, a camera, and/or the like, that support user interaction with the example server 400.

The example server 400 also includes memory 408 that stores data, executable instructions, modules, components, data structures, code segments, etc. The memory 408 can be implemented using computer readable media. Computer-readable media includes at least two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer storage media may also be referred to as "non-transitory" media. Although, in theory, all storage media are transitory, the term "non-transitory" is used to contrast storage media from communication media, and refers to a component that can store computer-executable programs, applications, and instructions, for at least a few seconds. In contrast, communication media may embody computer readable instructions, data structures, program modules, or other data in a modulated data signal, such as a carrier wave, or other transmission mechanisms. Communication media may also be referred to as "transitory" media, in which electronic data may only be stored for a brief amount of time, typically under one second.

An operating system 410 is stored in the memory 408 of the example server 400. The operating system 410 controls functionality of the processor 402, the communications interface 404, and the miscellaneous hardware 406. Furthermore, the operating system 410 includes components that enable the example server 400 to receive and transmit data via various inputs (e.g., user controls, network interfaces, and/or memory devices), as well as process data using the processor 402 to generate output. The operating system 410 can include a presentation component that controls presentation of output (e.g., display the data on an electronic display, store the data in memory, transmit the data to another electronic device, etc.). Additionally, the operating system 410 can include other components that perform various additional functions generally associated with a typical operating system. The memory 408 also stores miscellaneous software applications 412, or programs, that provide or support functionality for the example server 400, or provide a general or specialized device user function that may or may not be related to the example server 400 per se. The software applications 412 include system software applications and executable applications that carry out non-system functions.

The memory 408 also stores a service system 414 that is similar to the service system 134 shown stored on the server(s) 122 shown in FIG. 1. The service system 414 performs and/or controls operations to carry out the techniques presented herein and includes several elements that work together to provide improved systems and tools for smart routing of communications services. The service system 414 is able to access several types of data that it uses in its operations. The service system 414 has access to device data 416, which is data stored on or associated with user devices 112(1)-112(c) and 144(1)-114(e) (FIG. 1) that use the cellular network 102. The service system 414 also has access to network data 418, which is data associated with the cellular network 102 and components thereof. The service system 414 can also access a data store 420, which can store a number of files, programs, databases, etc. In the present example, the service system 414 can access agent profiles 422, user data 424, and resolution scripts 426 that are stored in the data store.

The agent profiles 422 include profiles for multiple agents in the user support services network 200 (FIG. 2). Content of the agent profiles 422 and use thereof is described in greater detail below. The user data 424 stores data associated with each user in the cellular network 102 (FIG. 1). This may include personal profiles of users, billing and account data of users, a history of enterprise interactions with user (i.e., previous service contacts, sales records, etc.), and the like. The resolution scripts 426 are described in greater detail, below, and are training materials that can be generated by the service system 414.

The service system 414 includes an intent determiner 428 that is used to determine an intent of a user communication. In other words, when a user contacts the enterprise, the intent determiner 428 determines what the user is calling/writing about. The intent determiner 428 identifies intent parameters 430 related to intent that will be used by an agent locator 432 to find an appropriate agent to service the contact. When an appropriate agent is found to service the contact, a router 434 sends the user communication and information related thereto to the agent. The service system 414 also includes a script engine 436 that is used to create resolution scripts 426 that show step-by-step instructions as to how to resolve certain issues, together with content related to the issue. The script engine 436 includes a monitor 438 that monitors an agent as the agent is resolving an issue, and creates the step-by-step instructions as to how the issue was resolved. The script engine 436 also includes a content finder 440 that is configured to find content related to the instructions, such as web pages, videos, or other content that can help train someone to be able to resolve a similar issue.

The service system 414 includes a capacity evaluator 442 and a capacity adjuster 444. The capacity evaluator 442 is configured to estimate a future need and the ability of a current state of the service system 414 to efficiently handle that need. The capacity adjuster 444 is configured to take actions to adjust capacity to meet the estimated need. The capacity evaluator 442 analyzes parameters of an intent and compares the parameters with data that may indicate that more user communications each with one or more similar intent parameters can be expected in the future. One way this is done is by the capacity evaluator 442 being aware of enterprise events that may affect service issues. To that end, the service system 414 includes event data 446 that identifies enterprise events, such as new device releases, device upgrade events, network upgrade events, promotional events, and the like. This feature is described in greater detail below.

The service system 414 also tracks multiple queues 448 of service requests. In the implementation shown in FIG. 4, one queue is maintained for each agent group 202-208 (FIG. 2) of the user support service network 200. Particularly, the service system 414 includes a device queue 450, a network queue 452, a retail queue 454, and a support queue 456. Each queue 450-456 tracks user communications assigned to agents in a respective support group. As will be shown in greater detail below, adding an ability to move a user communication to an agent outside of the agent's group allows for re-balancing of the queues 448 when wait times become untenable in one or more queues.

Example Agent Profile

FIG. 5 is a representation of an example agent profile 500 in accordance with the technologies described herein. The example agent profile 500 is similar to the agent profiles 422 shown in FIG. 4. Typically, each agent that can be expected to handle a user communication will have an agent profile associated with that agent. The example agent profile 500 includes a number of values used as an example in the present discussion. It is noted, however, that more, fewer, or different values may be utilized in an agent profile without departing from the scope of the recited claims, below.

The example agent profile 500 is associated with an agent identifier 502 that is used to identify an agent with which the agent profile 500 is associated. The agent profile 500, as shown, also includes multiple fields that indicate particular skills that may be found in the agent that the agent profile 500 represents. For example, the example agent profile 500 includes a first intent identifier ("Intent ID 1") 504, a second intent identifier ("Intent ID 2") 506, and a third intent identifier ("Intent ID 3") 508. The agent profile 500 will include as many intent identifiers as necessary to identify each intent with which the agent has experience resolving or has been trained to resolve. For example, "Intent ID 1" 504 may indicate "No Service," "Intent ID 2" 506 may indicate "Billing Question," and "Intent ID 3" 508 may indicate "Add a Line." Whether or not an agent can handle a particular intent may be based on historical instances, such as if an agent has previously handled that intent, or it may be based on skills assessments of the agent, on certain training taken by an agent, etc.

The example agent profile 500 also includes fields that identify agent skills with particular devices, particularly "Device ID 1" 510, "Device ID 2" 512, "Device ID 3" 514, "Device ID 4" 516, "Device ID 5" 518, "Device ID 6" 520, "Device ID 7" 522, "Device ID 8" 524, and "Device ID 9" 526. Examples of values that fields 510-526 may contain are ""Apple Phone," "Apple Tablet," "Amazon Fire," "Samsung Android Phone," "Android Phone," "Android Tablet,"

etc. The agent profile 500 can include as many entries as the number of devices with which the agent has knowledge.

Other fields of the example agent profile 500 may be used to identify particular traits of the corresponding agent. By way of example, the example agent profile 500 includes a "Time on Job" field 528, a "Resolution" field 530, a "Response Time" field 532, and a "Customer Rating" field 534. As shown below, these fields 528-534 can be used to select agents of various quality to reach a target capacity to handle certain issues. For example, it may be normally desired to route user communications only to agents that have an average resolution of 97% or more. However, if limiting routing to those particular agents does not fill a capacity need, agents having a lower average resolution score may be chosen. More details on adapting capacity are included in the discussion below.

Another type of skill that may be reflected in the agent profile 500 is an agent's ability to handle issues that arise with users in different geographic areas. The example agent profile 500 includes a "Geography Region 1" field 536, a "Geography Region 2" field 538, and a "Geography Region 3" field 540. An enterprise may believe that certain agents have skills that work better with users from different geographic areas. If so, then they can track agent skills with users in different areas. For example, areas may be divided into "Urban" and "Rural," or "North America," "South America," and "Asia," etc.

As shown, the example agent profile 500 also includes group identifiers ("Group ID 1" 542, "Group ID 2" 544, "Group ID 3" 546) that correspond to agent groups (202-208, FIG. 2) to indicate that an agent has skills that are related to groups other than a group or position in which the agent currently works. For example, an agent may have previous experience working in the Customer Support Group 204 (FIG. 2), even though the agent is now assigned to the retail group 202. Identifying an agent's former groups results in a more accurate assessment of the agent's skills.

The previous skill identifier values are shown as examples of the kind of information that might be stored in an agent profile. In various implementations, the example agent profile 500 may include more, fewer, and/or different entries.

Example Intent Parameters Array

FIG. 6 is a representation of an example intent parameters array 600 in accordance with the technologies described herein. The example intent parameters array 600 is similar to the intent parameters 430 shown in and described with regard to FIG. 4. The example intent bitmask 602 describes but one method that may be used to match intents to agents, but any other method may be used within the scope of the present claims.

The example intent parameters array 600 typically includes data associated with a user, the user's device, the device network, etc., which an agent will find helpful in resolving the user's issue. The example intent parameters array 600 includes a contact identifier 602 and a device identifier 604. The contact identifier 602 identifies the user communication, e.g., usually a cell phone number for a cell phone. The device identifier 604 identifies the type of device owned or used by the user. The example intent parameters array 600 also includes an intent identifier 606 that indicates the intent determined with respect to the user communication. In the event that no intent could be determined, the intent identifier 606 may indicate that no intent is known.

The example intent parameters array 600 also includes several fields that reflect device data collected, for example, with a device diagnostics application (not shown). These fields include "Device Data 1" 608, "Device Data 2" 610, "Device Data 3" 612, "Device Data 4" 614, and "Device Data 5" 616. The example intent parameters array 600 also includes a network tower identifier 618 that identifies a cellular tower that the user's device is hitting, and multiple data related to the network: "Network Data 1" 620, "Network Data 2" 622, and "Network Data 3" 624. In addition to data gathered regarding the user's device and the network, the example intent parameters array 600 also includes data related to devices that are nearby the user's device, i.e., "neighbors," specifically "Neighbor Data 1" 628, "Neighbor Data 2" 630, "Neighbor Data 3" 632, and "Neighbor Data 4" 634.

The example intent parameters array 600 also includes data associated with the user (user data 424, FIG. 4), such as user history information that denotes a subject of previous contacts from the user. These are included in "User Data 1" 636, "User Data 2" 638, and "User Data 3" 640. Although data related to specific items are shown in the example intent parameters array 600, it is noted that more, fewer, and/or different parameters may make up the example intent parameters array 600. Any data that might be helpful to an agent trying to resolve an issue specified in a user communication can be included therein.

Example User Support Service Queues

Figure 7A:
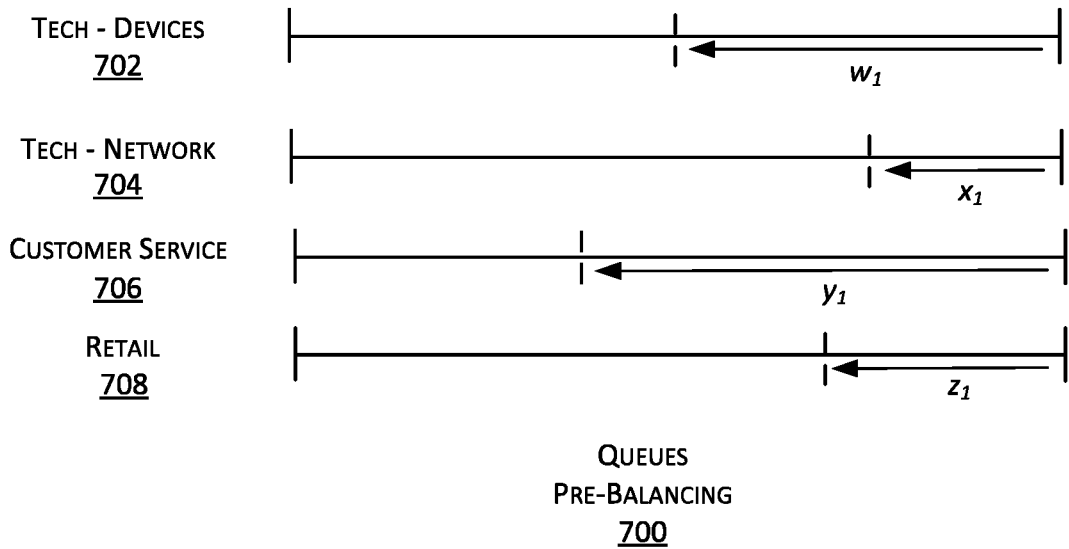
FIG. 7a is an illustration of a plurality of user support service queues prior to performing a re-balancing operation on the queues.
Figure 7B:
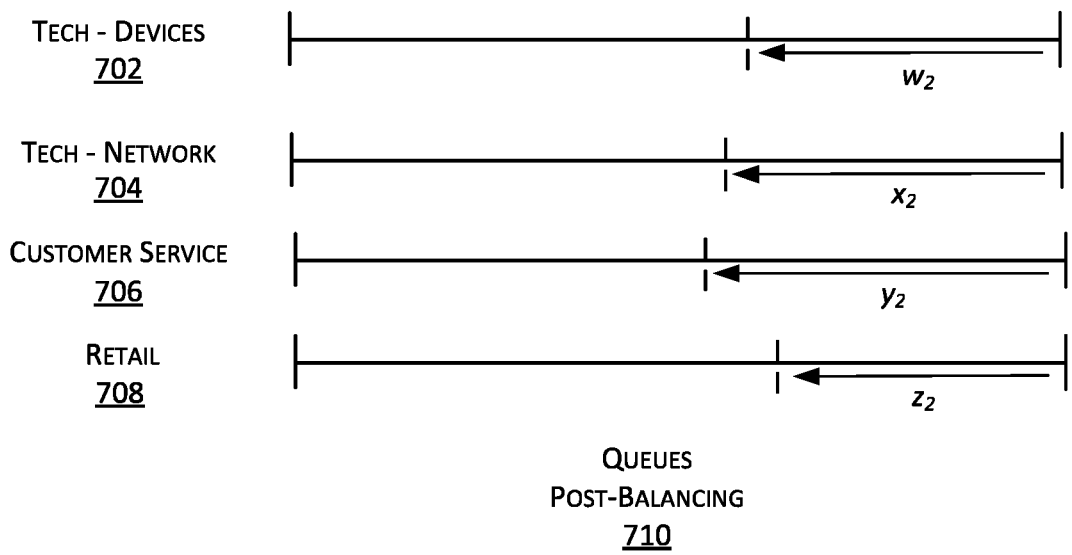
FIG. 7b is an illustration of a plurality of user support service queues after re-balancing.

FIG. 7a is an illustration of a plurality of user support service queues 700 prior to performing a re-balancing operation on the queues. The service system 414 (FIG. 4) maintains job queues for each agent group 202-208 (FIG. 2). FIG. 7a shows a tech-devices queue 702, a tech-network queue 704, a customer service queue 706, and a retail queue 708 (similar to the queues 448 shown in FIG. 4). From time to time, the service system 414 may re-balance the queues 702-708 by identifying agents that can take user communications from a queue with which the agent is not primarily associated. For example, an agent that works in the device tech support group 202 may also have skills that can be utilized to handle user communications having an intent related to a network. If the tech-network queue 704 reaches an undesirable length, the service system 414 may re-allocate a job in the tech-network queue 704 to the agent in the device technology support group 206 (FIG. 2), thus shortening the tech-network queue 704 and adding to the tech-devices queue 702. Each of the queues 702-708 has a number of jobs lined up for routing. The number of jobs for the tech-devices queue 702 is indicated by $w_1$; the number of jobs for the tech-network queue 704 is indicated by $x_1$; the number of jobs for the customer service queue 706 is indicated by $y_1$; and the number of jobs for the retail queue 708 is indicated by $z_1$. This may be done several times among all the queues 702-708 until the queues are closer to the same length, as shown in FIG. 7b. FIG. 7b is an illustration of the user support service queues 710 shown in FIG. 7a after re-balancing. The number of jobs in each queue ($w_2$, $x_2$, $y_2$, $z_2$) after re-balancing are closer to equal than they were prior to re-balancing.

Example Methodological Implementation: Routing

Figure 8:
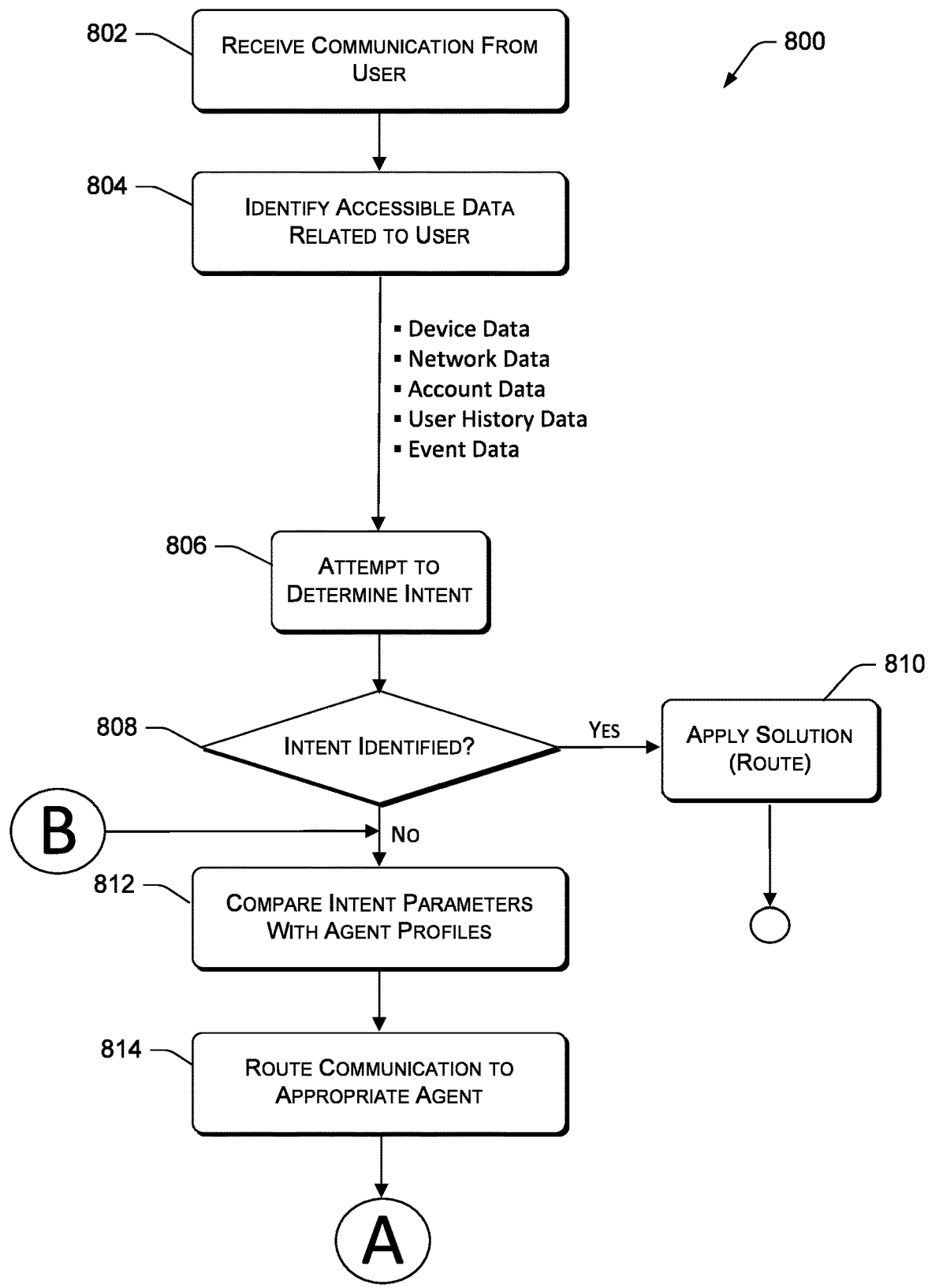
FIG. 8 is a flow diagram depicting a methodological implementation of using network device data to route a user communication to a correct destination.

FIG. 8 is a flow diagram 800 depicting an example methodological implementation of using network device data to route a user communication to a correct destination. The flow diagram 800 may be applied in context with the elements and reference numerals previously shown in FIGS. 1-7 and described with respect thereto. In the following discussion of FIG. 8, continuing reference is made to FIGS. 1-7. In the following discussion, certain operations may be attributed to one or more particular elements of a computing device (such as the example server 400, FIG. 4). However, it is noted that any operations described below may be accomplished, in whole or partially, by one or more other elements in the example server 400 or other computing devices.

At block 802, a user communication is received by the communication interface 404 (FIG. 4) of the example server 400. The user communication may be in one or more of several forms, such as an e-mail message, a text message, a voice message, a telephone call, etc. A user identifier associated with the user communication, such as a phone number of a user initiating the use contact, is identified from the user communication. From the user identifier, the service system 414 is able to collect a significant amount of data related to the user communication (block 804), including device data, network data, account data, user history data, etc. In addition, the service system 414 may also collect other data relevant to the user communication, including event data, data related to similar devices of other users, data related to devices in a geographical area proximal to the user, etc. The data collected at block 804 is used to create the intent parameters 430 (i.e., the intent parameters array 600 (FIG. 6)). At block 806, the intent determiner 428 determines an intent associated with the user communication. If an intent is identified ("Yes" branch, block 808), then the user communication is routed to an appropriate agent or agent group at block 810.

If an intent cannot be identified ("No" branch, block 808), then the agent locator 432 of the service system 414 compares the intent parameters 430 with the agent profiles 422 and determines a best match. At block 814, the user communication is routed to the agent identified at block 812. The process continues at connector "A" in FIG. 9.

Example Methodological Implementation: Capacity Evaluation

Figure 9:
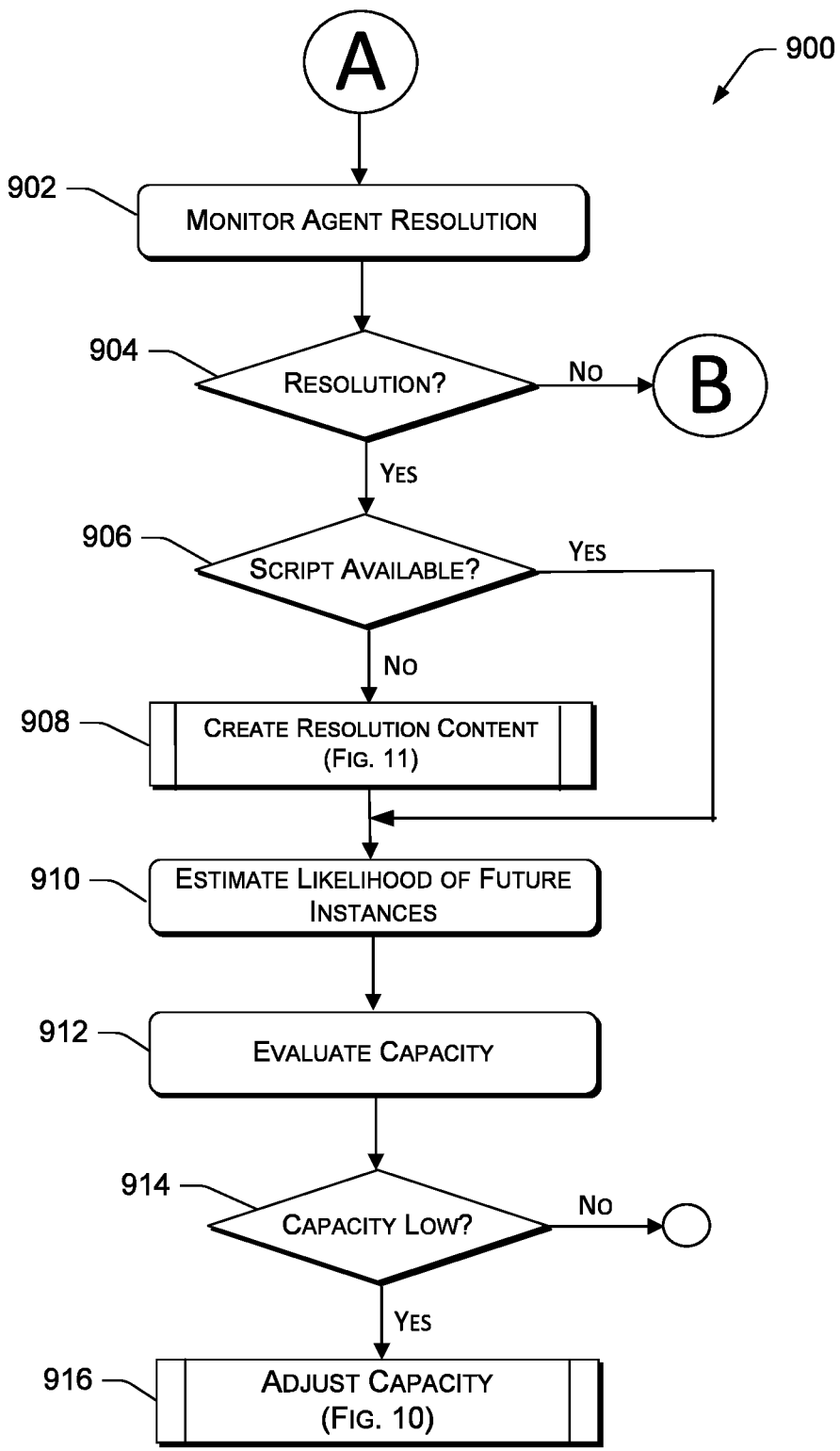
FIG. 9 is a flow diagram depicting a methodological implementation of evaluating service system capacity in accordance with the techniques described herein.

FIG. 9 is a flow diagram 900 depicting an example methodological implementation of evaluating service system capacity in accordance with the techniques described herein. In the following discussion, continuing reference is made to elements and reference numerals of previous figures. At block 902, the monitor 438 (FIG. 4) of the script engine 436 monitors actions of the agent to which the user communication was routed at block 812 (FIG. 8), above. The monitor 438 can be configured to monitor keyboard strokes, record/transcribe phone conversations, record text and email messages between the agent and the user, save screenshots periodically during the resolution process, etc. Basically, the monitor 438 records every action taken by the agent in resolving the issue that is the subject of the user communication. If the agent is unable to resolve the issue specified in the user communication ("No" branch, block 904), then the process reverts to block 812 (FIG. 8) where a new agent is located and the user communication is re-routed. Again, the agent's actions are monitored and recorded at block 902.

If the agent resolves the user communication ("Yes" branch, block 904), then the service system 414 determines if there is a script in existence (i.e., stored in resolution scripts 426) that relates to the resolution provided by the agent. If not ("No" branch, block 906), then the script engine 436 creates a resolution content script at block 908. The created script may be provided by the support engine 306 to another agent that encounters a user communication that includes one or more similar intent parameters as the user communication. Details of the script creation process are described below, with respect to subsequent figures. If there is a script available ("Yes" branch, block 906), then the creation process (block 908) is not performed.

At block 910, the capacity evaluator 442 estimates a likelihood that future instances of similar intents, such as at least one similar intent parameter in each of one or more future user communications, can be expected. To accomplish this, the capacity evaluator 442 examines circumstances surrounding the intent, and whether those circumstances are likely to produce multiple similar intents. In other words, the capacity evaluator 442 determines if the intent of the user communication recently resolved is a unique issue, or if it is an issue that can be expected to affect multiple users in a similar situation. For example, if the intent of the user communication was an issue with an iOS® upgrade that was recently released by Apple®, then it can be expected that other devices on the cellular network 102 will experience the same issue. The service system 414 can then determine how many such devices are on the network 102 and estimate that the same issue will occur as many times as there are iOS® devices on the network 102.

As another example, the enterprise may have recently initiated a promotional event (identifiable from the event data 446) that was the reason for the user communication. For example, if the enterprise has a promotion where network phone users can register to receive reduced data rates for a specified period, and the user communication was related to the promotion, the capacity evaluator 442 may estimate how many users can be expected to respond to the promotion.

After a determination is made as to how many user communications can be expected due to the recently resolved issue, the capacity evaluator 442 evaluates the capacity of the user support services network 200 (FIG. 2) to handle the number of expected user communications at block 912. To do this, the capacity evaluator 442 examines the agent profiles 422 to determine how many agents are equipped with the knowledge to handle the expected user communications. This determination is made based on skills required to handle the intent of the user communications, and on skills identified in the agent profiles 422. In the example of a user communication intent being related to an iOS® upgrade, agent profiles 422 that identify a skill (experience and/or training) with iOS® devices can be counted as being equipped to handle user communications with that intent.

The number of agents with skills to resolve such an issue does not have a one-to-one correspondence with the number of expected user communications related to the issue. An evaluation can also be made as to a time period over which the user communications will occur, as well as to a number of such user communications that can be handled by each skilled agent. For example, in the above example related to the promotion, in addition to identifying agents with the skills to handle such a user communication (e.g., user account skills), the capacity evaluator 442 should also know a period of time over which the number of user communications will occur, and the number of such user communications that can be handled by one agent over that period of time. From this information, the capacity evaluator 442 can determine how many agents having user account skills will be required to handle all of the expected user communications related to the promotion.

For example, referring back to the iOS® upgrade example, if the capacity evaluator 442 estimates that: (1) fifty thousand (50,000) iOS® device users will respond to the promotion; (2) that the user communications will mostly occur over a two-week period after the upgrade is available; (3) that a skilled agent can handle ten (10) such user communications per day in addition to the agent's typical workload; and (4) there are five hundred (500) agents having the skills necessary to resolve the issues, then the skilled agents can handle seventy thousand (70,000) user communications over the two (2) week period. As such, there is sufficient capacity to handle the user communications ("No" branch, block 914), and no additional capacity needs to be added.

However, if the number of expected contacts is one hundred thousand (100,000), then agent capacity will be low ("Yes" branch, block 914) because five hundred (500) agents can handle ten (10) user communications per day, over a 14 (fourteen) day period. This means that the capacity to handle the user communications is seventy thousand (70,000), which is not enough to handle the one hundred thousand (100,000) user communications that are expected. In that case, then the capacity is adjusted at block 916.

Example Methodological Implementation: Capacity Evaluation

Figure 10:
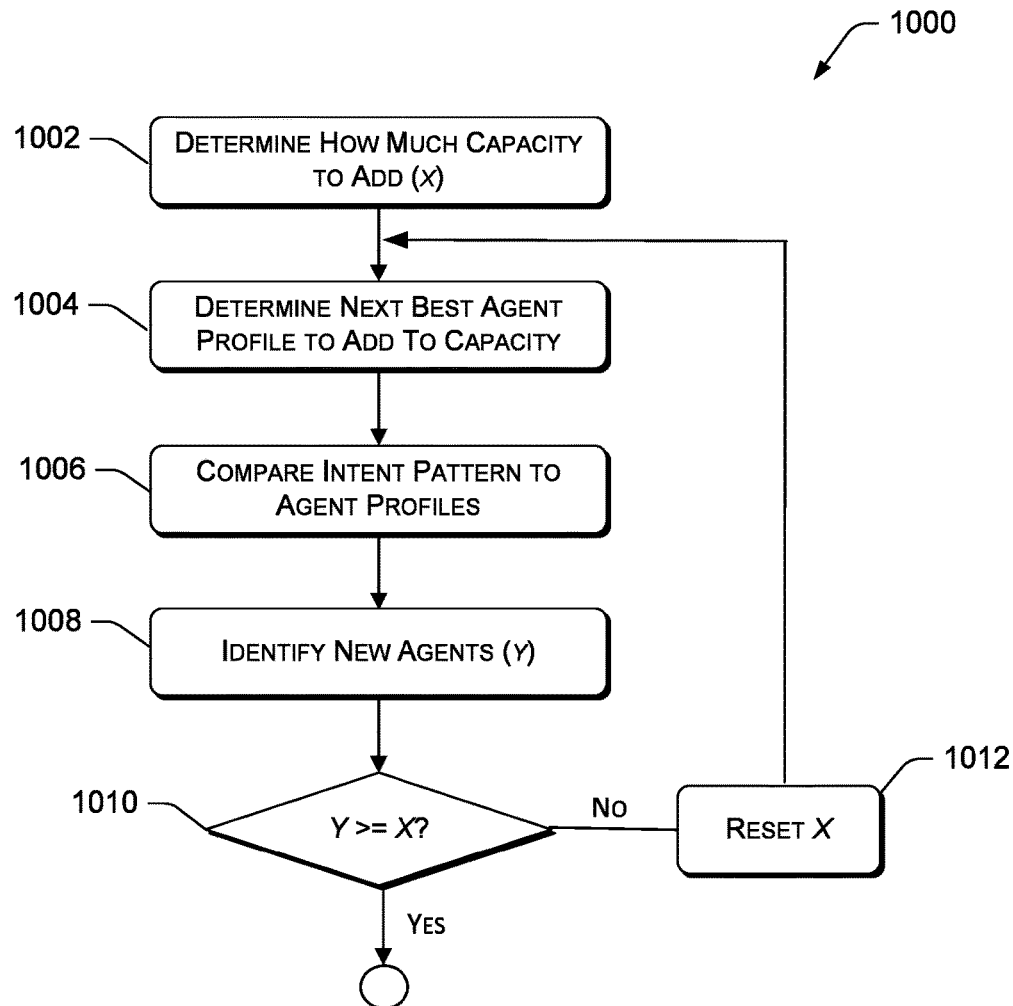
FIG. 10 is a flow diagram depicting a methodological implementation of adjusting service system capacity in accordance with the techniques described herein.

FIG. 10 is a flow diagram 1000 depicting a methodological implementation of adjusting service system capacity in accordance with the techniques described herein. In the following discussion of FIG. 10, continuing reference is made to elements and reference numerals shown in and described with respect to previous figures. Also, the following discussion continues with the iOS® example described above.

At block 1002, the capacity adjuster 444 determines how much capacity needs to be added to adequately handle the expected user communications, represented in FIG. 10 as the value "x." Using the numbers provided in the previous example, the expected number of user communications is one hundred thousand (100,000) and the evaluated capacity to handle the user communications is seventy thousand (70,000), so the capacity adjuster 444 determines that agents need to be added to handle thirty thousand (30,000) user communications with the iOS® upgrade issue. Since each additional agent can handle ten (10) such user communications per day for fourteen (14) days, each additional agent adds capacity for one hundred forty (140) user communications. Therefore, to handle thirty thousand (30,000) user communications, two hundred fifteen (215) additional agents will need to be identified that can support the contacts.

One way in which capacity can be added is to identify agents that have skills similar to those required to resolve the user communications and include them in routing decisions for the upcoming user communications. In the present example, assume the five hundred (500) agents sufficiently skilled in iOS® are part of the device technology support Group 206 (FIG. 2). It is possible that there are other agents in the same group that, while they don't have specific knowledge of iOS®, are familiar with assisting users with operating system upgrades for, say, Android® devices. The capacity adjuster 444 may consider such agents as capacity to handle the iOS® upgrade issue. Furthermore, there may be agents in the network technology support group 208 that have experience with assisting users of iOS® devices with network issues. Since they are probably familiar with iOS®, the capacity adjuster 444 may consider such agents sufficiently knowledgeable to assist users with the iOS® issue. At block 1004, the capacity adjuster 444 determines a next best agent profile (such as described above) and compares the intent parameters 430 to the agent profiles 422 (block 1006) to identify new agents that can be added to the capacity calculation, represented in FIG. 10 as value "y" (block 1008). At block 1010, the capacity adjuster 444 determines if enough new capacity has been identified (if y>=x). If not ("No" branch, block 1010), then the amount of capacity still to be added is determined at block 1012 (x is reset to account for agents identified in previous steps). Once enough capacity has been added ("Yes" branch, block 1010), then the process is complete.

Example Methodological Implementation: Creating Resolution Scripts

Figure 11:
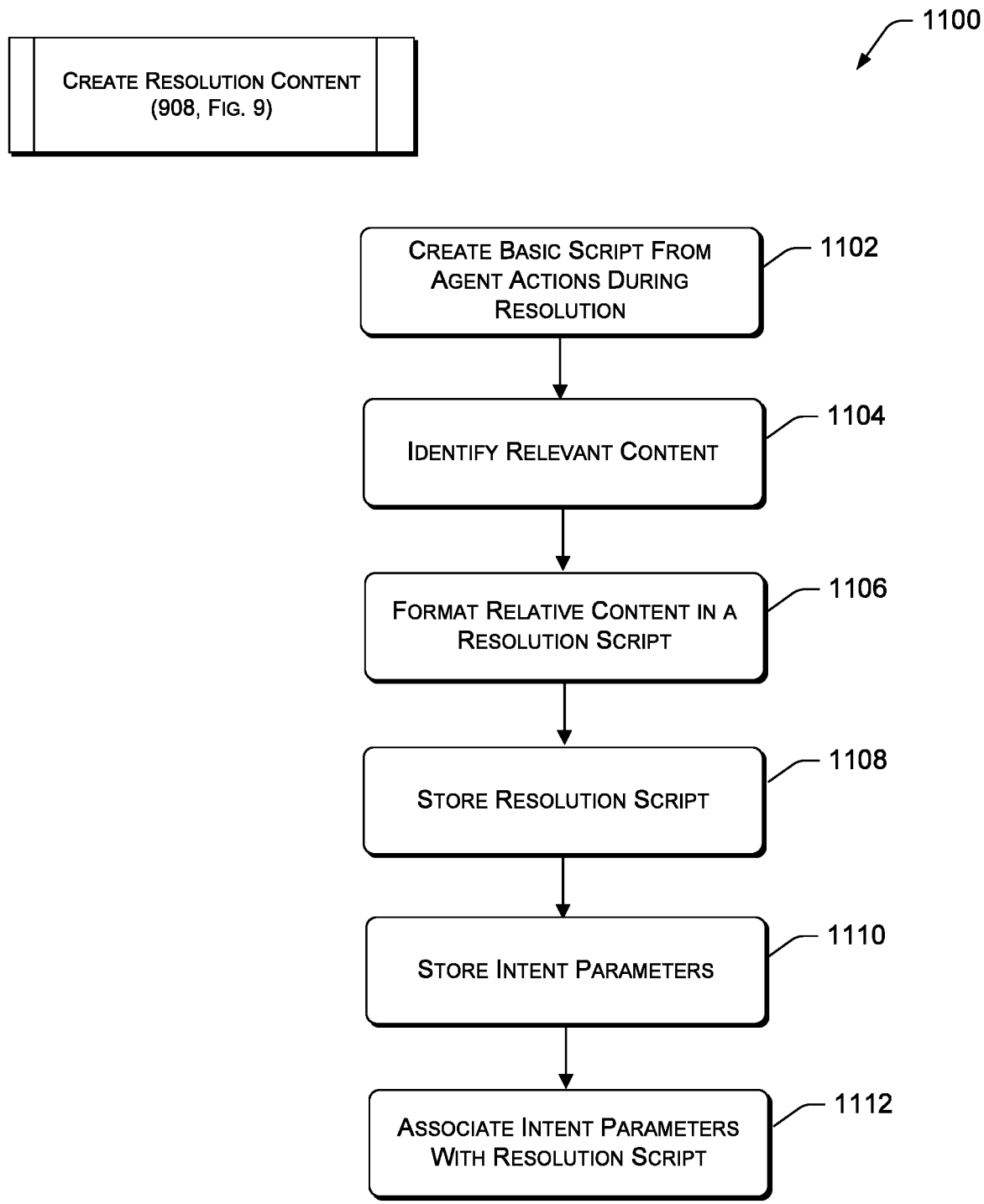
FIG. 11 is a flow diagram depicting a methodological implementation of creating resolution scripts in accordance with the techniques described herein.

FIG. 11 is a flow diagram 1100 depicting a methodological implementation of creating resolution scripts in accordance with the techniques described herein. FIG. 11 includes detailed operations referred to in block 908 of FIG. 9. In the following discussion of FIG. 11, continuing reference is made to elements and reference numerals included in and described in previous figures.

Another way in which the capacity adjuster 444 can increase capacity is by identifying agents who are deemed to have skills to address a user communication intent provided they have access to information as to how to assist a user with the issue. This may mean that agents that have technical skills in a certain area may be considered to handle technical issues in another area if provided with content related to the technical issue in the other area. For example, an agent may have skills relating to resolving issues with Samsung® Android® phones. Although such an agent may have never worked with, say, an LG Android phone, the agent is likely to be able to assist a user with an LG® Android® phone issue if the agent knows some specifics about the issue (from the intent parameters 430) and the agent is provided with materials about LG® Android® phones and/or step-by-step instructions as to how to resolve the particular issue with the LG® Android® phone. The methodological implementation shown in FIG. 11 provides details into that process.

At block 1102, as previously described, the monitor 438 of the script engine 436 creates a script from actions an agent performed during resolution of a particular intent. The script can include a step-by-step account of the agent's keystrokes, mouse clicks, etc., from the session. In addition, the content finder 440 of the script engine 436 may identify content that is relevant to the intent (block 1104). Such content may include web pages related to the technical issue, links to user manuals or information from a device manufacturer, links to a YouTube® video, etc. At block 1106, the script engine 436 formats the agent actions and the relevant content into a resolution script 426. The resolution script 426 is then stored at block 1108.

In addition to storing the resolution script 426, the script engine 436 also stores at least some of the intent parameters 430 associated with the user communication intent that the resolution script 426 is meant to address (block 1110). The intent parameters 430 are associated with the resolution script 426 at block 1112. By storing and associating intent parameters 430 with the resolution script 426, future operations can easily identify a resolution script 426 that was created to address a user communication that has certain intent parameters. For example, when a user communication is routed to an agent at block 814 (FIG. 8), an appropriate resolution script 426 may be provided to the agent. An appropriate resolution script 426 provided to an agent is a resolution script 426 associated with intent parameters that sufficiently match intent parameters 430 of the user communication.

Example Resolution Script

Figure 12:
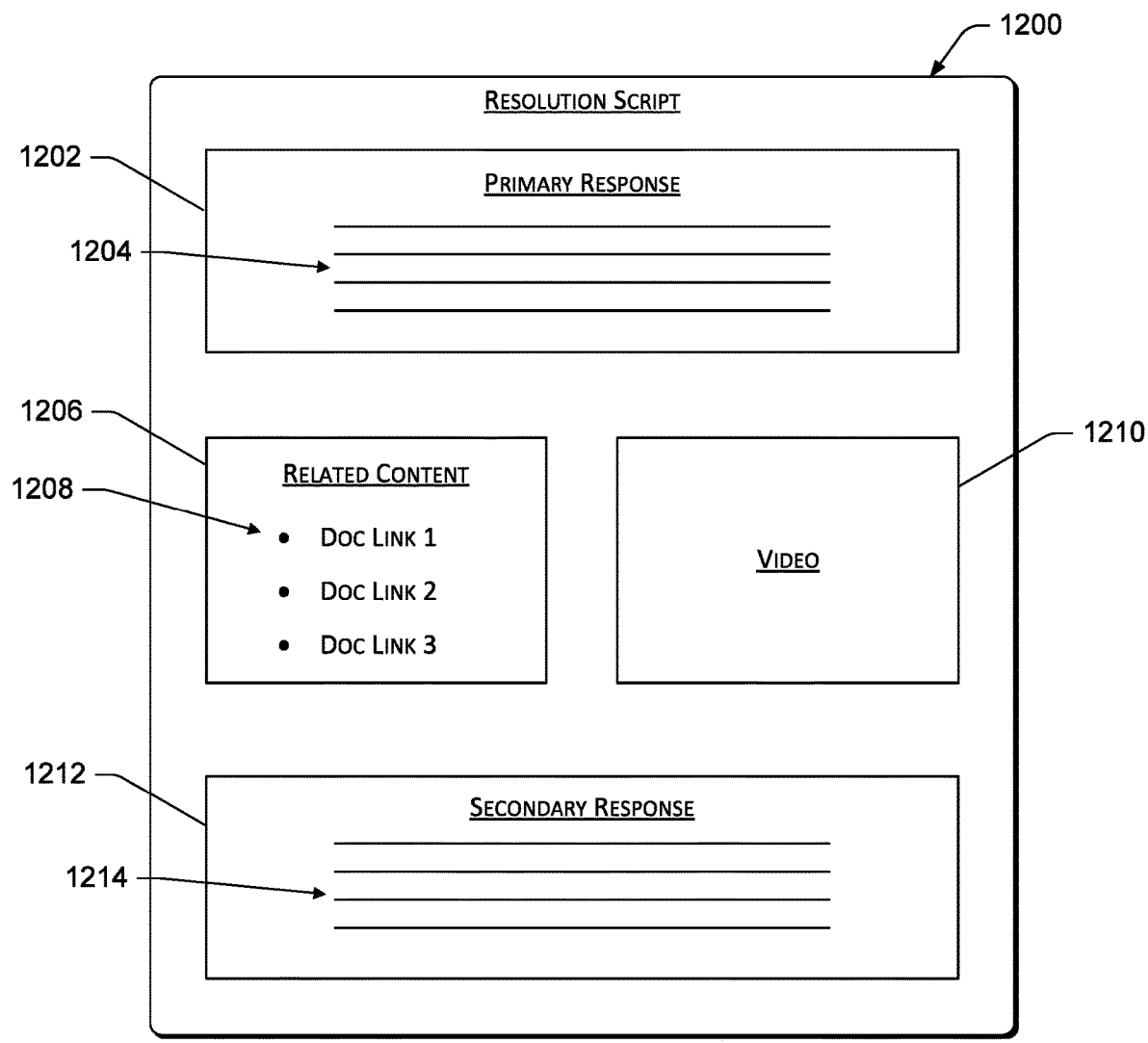
FIG. 12 is a representation of a resolution script in accordance with the techniques described herein.

FIG. 12 is a representation of an example resolution script 1200 in accordance with the techniques described herein. In the following discussion of FIG. 12, continuing reference may be made to elements and reference numerals shown and described in previous figures.

The example resolution script 1200 includes a primary response window 1202 that is used to display step-by-step instructions 1204 that an agent can replicate to assist a user to resolve an issue. The step-by-step instructions 1204 are the result of monitoring agent actions taken when previously resolving a similar user intent. The example resolution script 1200 also includes a related content window 1206, that includes one or more links 1208 to content related to the issue. For example, if the issue is related to a particular device, the content window 1206 may display a link to a user manual for the device.

The example resolution script 1200 also includes a video window 1210 that may be configured to display a video related to the resolution. For example, the video window 1210 may be linked to a YouTube® video that shows steps taken to do certain things on a certain device. In addition to the primary response window 1202, the example resolution script 1200 also includes a secondary response window 1212. There may be circumstances where one of two or more solutions may be available, such as if the resolution relates to an operating system having different versions. In such a case, the secondary response window 1212 is provided to display step-by-step instructions 1214 detailing a resolution that differs from the primary resolution, if only in very minor ways. In such a case, the agent may resort to the secondary response in the event that the primary response does not resolve the issue or for other reasons.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    receiving a user communication from an electronic device at a cellular network;
    determining, at the cellular network, one or more intent parameters of the user communication;
    estimating, at the cellular network, an amount of future user communications each having at least one similar intent parameter to the one or more intent parameters;
    evaluating, at the cellular network, a capacity of a service system of the cellular network to handle the estimated amount of future user communications, the capacity including a number of agents that are available to resolve issues in the estimated amount of future user communications; and
    in response to the estimated amount exceeding the evaluated capacity, increasing, at the cellular network, the capacity of the service system with additional agents that are capable of resolving the issues.

2. The method as recited in claim 1, wherein evaluating a capacity of the service system comprises correlating the one or more intent parameters to agent profiles and identifying agents that have skills related to the one or more intent parameters.

3. The method as recited in claim 2, wherein the increasing the capacity of the service system comprises:
    using the agent profiles to identify particular agents that can handle the future user communications; and
    adding at least some of the identified particular agents to the capacity.

4. The method as recited in claim 2, wherein the increasing capacity of the service system comprises:
    identifying particular agents that can handle the future user communications if the particular agents have guidance materials; and
    adding a number of the identified particular agents to the capacity.

5. The method as recited in claim 1, wherein the determining the one or more intent parameters comprises:
    identifying data related to the electronic device or a user associated with the electronic device; and
    storing at least some of the data related to the electronic device or the user in an intent parameters array.

6. The method as recited in claim 5, wherein the data related to the electronic device of the user comprises one or more of the following types of data: device data; network data; user history data; user account data; or event data.

7. The method as recited in claim 1, wherein the evaluating the capacity of the service system comprises correlating the one or more intent parameters to agent profiles that identify skills possessed by respective agents.

8. A system, comprising:
    a processor; and
    memory storing components executable or accessible by the processor, the components comprising:
    an intent parameters array that stores one or more intent parameters associated with a user communication;
    a network capacity evaluator configured to estimate a number of future user communications each having at least one similar intent parameter to the one or more intent parameters to be received by a service system, and to evaluate a capacity of user support agents of the service system to handle the estimated number of future user communications; and
    a network capacity adjuster configured to identify additional agents that have appropriate skills to handle the future user communications and increasing the capacity of the service system with the identified additional agents if the estimated number of future user communications exceeds the capacity.

9. The system as recited in claim 8, wherein identifying additional agents that have appropriate skills to handle the future user communications comprises identifying additional agents who have previous experience resolving user communications with the one or more intent parameters.

10. The system as recited in claim 8, wherein identifying additional agents that have appropriate skills to the future user communications comprises identifying additional agents who have skills related to one or more intent parameters.

11. The system as recited in claim 8, wherein identifying additional agents that have appropriate skills to handle the future communications comprises identifying additional agents who have skills to resolve specific user communications with the one or more intent parameters if instructions are provided to the additional agents.

12. The system as recited in claim 8, further comprising an intent determiner configured to identify the one or more intent parameters associated with the user communication and to store intent parameters in the intent parameters array.

13. The system as recited in claim 12, wherein identified intent parameters are one or more of the following types of data: device data; network data; user history data; user account data; or event data.

14. One or more non-transitory computer-readable media including computer-executable instructions that, when executed, perform the following:
    receiving a user communication from an electronic device in communication with a cellular network;

determining one or more intent parameters of the user communication that identify data related to the user communication;

estimating a number of future user communications each having at least one similar intent parameter to the one or more intent parameters;

evaluating a capacity of a service system of the cellular network to handle the estimated amount of future user communications, the capacity including a number of agents that are available to resolve issues in the estimated amount of future user communications; and in response to the estimated number of future user communications exceeding the evaluated capacity, increasing capacity of the service system with additional agents that are capable of resolving the issues.

15. The one or more non-transitory computer-readable media as recited in claim 14, wherein evaluating a capacity of the service system comprises correlating the one or more intent parameters to agent profiles and identifying agents that have skills related to the one or more intent parameters.

16. The one or more non-transitory computer-readable media as recited in claim 15, wherein the increasing capacity of the service system comprises:

using the agent profiles to identify particular agents that can handle the future user communications; and adding at least some of the identified particular agents to the capacity.

17. The one or more non-transitory computer-readable media as recited in claim 14, wherein the increasing capacity of the service system comprises:

identifying particular agents that can handle the user communications if the particular agents have guidance materials; and adding a number of the identified particular agents to the capacity.

18. The one or more non-transitory computer-readable media as recited in claim 14, wherein the determining the one or more intent parameters comprises:

identifying data related to the electronic device or a user associated with the electronic device; and storing at least some of the data related to the electronic device or the user in an intent parameters array.

19. The one or more non-transitory computer-readable media as recited in claim 18, wherein the data related to the electronic device of the user comprises one or more of the following types of data: device data; network data; user history data; user account data; or event data.

20. The one or more non-transitory computer-readable media as recited in claim 14, wherein the evaluating the capacity of the service system comprises correlating the one or more intent parameters to agent profiles that identify skills possessed by respective agents.

* * * * *